United States Patent

[11] 3,618,538

| [72] | Inventor | Leonard M. Brannan<br>3008 Paddock Road, Omaha, Nebr. 68124 |
|---|---|---|
| [21] | Appl. No. | 7,478 |
| [22] | Filed | Feb. 2, 1970 |
| [45] | Patented | Nov. 9, 1971 |

[54] APPARATUS FOR APPLYING FERTILIZERS BENEATH SOIL
2 Claims, 6 Drawing Figs.

| [52] | U.S. Cl. | 111/7, 111/80 |
|---|---|---|
| [51] | Int. Cl. | A01c 23/02 |
| [50] | Field of Search | 111/1, 6–7, 73, 80, 86 |

[56] References Cited
UNITED STATES PATENTS

| 486,200 | 11/1892 | Starks et al. | 111/7 |
|---|---|---|---|
| 2,315,204 | 3/1943 | Holle | 111/86 |
| 2,734,439 | 2/1956 | Padrick | 111/7 X |
| 2,849,969 | 9/1958 | Taylor | 111/7 |
| 2,859,718 | 11/1958 | Barkley | 111/7 |
| 2,876,719 | 3/1959 | Holle | 111/7 |
| 3,384,039 | 5/1968 | Ratliff | 111/7 |

*Primary Examiner*—Robert E. Bagwill
*Attorney*—Dawson, Tilton, Fallon & Lungmus ABSTRACT: An improved plow knife is disclosed for introducing a dry fertilizer and anhydrous ammonia in a common band at a predetermined depth beneath the surface of the soil being treated. The shank of the plow, which is generally vertical, is hollow to permit flow of dry fertilizer through it under gravity. The dry fertilizer is deposited through the heel of the knife in a band at the base of the channel cut by the knife. The toe of the plow is located forward of the leg of the shank, and the contour of the leading edge is continuously smoothly curved from the toe to a location on the shank near the surface of the soil. The entire leading edge is flat over a width of about seven-eighths of an inch, with beveled side edges so that when the plow is embedded and pulled, a ribbon of dirt is forced upwardly along the smoothly curved, flat surface and above the soil level in a rolling, upward and forward motion to remove any debris such as corn stalks and husks from the soil above the surface where it is readily discarded from the knife and does not interfere with operation. A conduit for liquid ammonia is affixed to the back of the blade and side moldboards are located at the side of the shank to gather dirt from the sides of the channel and move it over the band of ammoniated fertilizer.

PATENTED NOV 9 1971 3,618,538
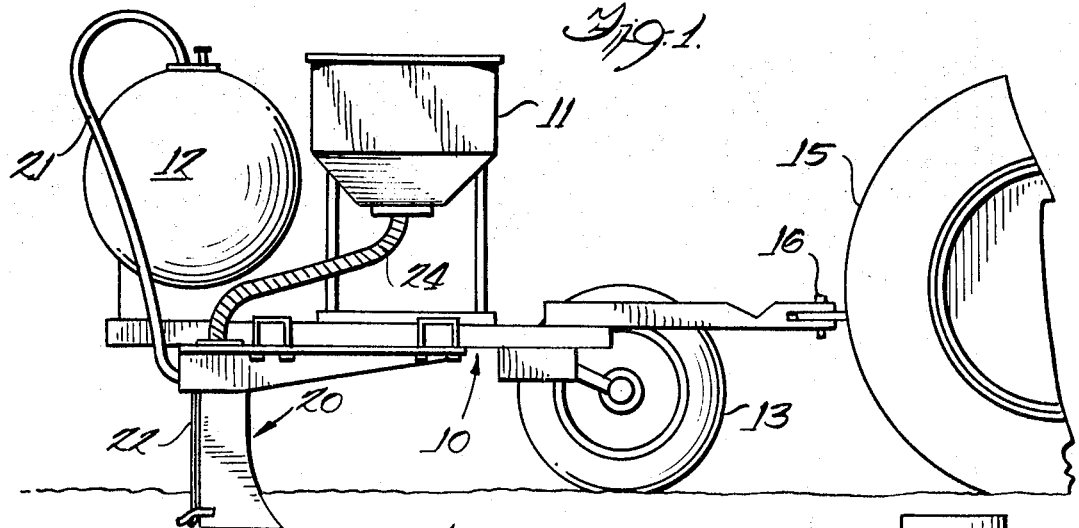
Fig. 1.
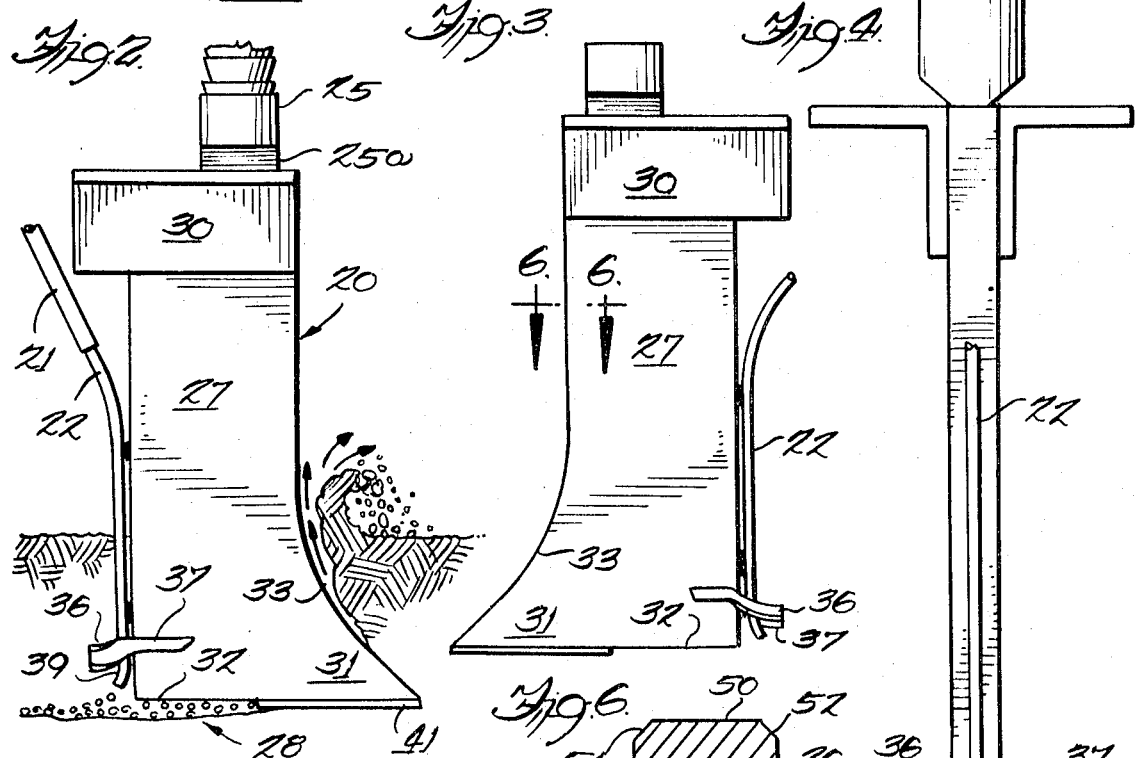
Fig. 2. Fig. 3. Fig. 4.
Fig. 5. Fig. 6.
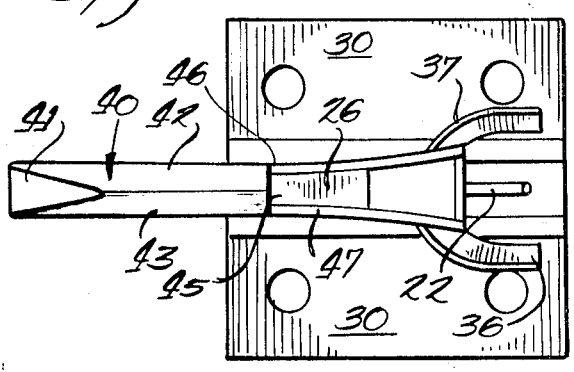
Inventor
Leonard M. Brannan
by: Dawson, Tilton
Fallon & Lungmus
Atty's 3,618,538

APPARATUS FOR APPLYING FERTILIZERS BENEATH SOIL

BACKGROUND AND SUMMARY

This invention relates to an improved structure for a plow which is used to introduce fertilizer into the soil being treated at subsurface levels. In particular, it is an improvement over the plow knife disclosed in my copending application for "Method and Apparatus For Applying Dry Fertilizer and Anhydrous Ammonia in a Common Band," Ser. No. 813,968, filed Apr. 7, 1969.

In that application, there is disclosed apparatus for feeding dry fertilizer through a vertical conduit formed in the plow knife. The liquid ammonia is fed by means of a conduit attached to the rear of the plow knife; and the exit orifice of the ammonia conduit is located rearwardly of the back of the knife. The fry fertilizer falls near gravity through the conduit in the plow knife and is deposited in a band at the base of the channel formed by the plow knife prior to the application of the anhydrous ammonia. As the shank is pulled along, the depositing orifice of the ammonia tube passes over the band of dry fertilizer, and it directs the ammonia onto the dry fertilizer at the predetermined depth and behind the plow.

In the operation of the plow knives or fertilizer applicators, there is always a desire to minimize the power required to pull the knife. Thus, the leading edge of the formed into is usually formed into a cutting edge in order to separate the soil as the knife is pulled through. However, I have found that if the leading edge is formed into a cutting edge or for example, is formed into a V-shape, it collects debris beneath the soil level such as buried corn husks and stalks which greatly reduce the efficiency of the knife and increase power requiremens. Once a few corn stalks are doubled over the leading edge of the knife, this tendency to collect debris further increases; and not only does it increase the drawbar torque requirements of the pulling vehicle but it also widens the channel or trench, thus permitting escape of the deposited ammonia before it has had a chance to react with the dry fertilizer. In the present invention, the leading edge of the plow knife as viewed from the side has a smooth curvature from the toe up to a location on the leg of the plow near the soil surface; and the leading edge has a flat transverse surface having a width of about three-fourths of an inch so that when it is pulled, a continuous ribbon of the soil is transported upwardly from the toe along the leading edge and moved along the curved portion from the tow above the surface soil. This ribbon of soil carries with it any collected debris which is then deposited to the side of the plow above the surface of the soil, thus providing a mechanism for continuously cleaning the leading edge of the plow and removing any debris therefrom. The width of the channel provided by the plow knife remains contact, and as the molboards at the rear and side of the plow shank cover the deposited anhydrous ammonia with dirt from the side of the channel, escape of the ammonia is prevented.

Other features and advantages of the present invention will be apparent to persons skilled in the art from the following detailed description of a preferred embodiment accompanied by the attached drawing wherein identical reference numerals will be used to refer to like parts in the various views.

THE DRAWING

FIG. 1 is a side-elevation view of apparatus adapted to be drawn by a traction vehicle for fertilizing at a subsurface level;

FIGS. 2 and 3 are respectively left and right side-elevation views of the improved plow knife structure according to the present invention;

FIG. 4 is a rear view of the plow knife of FIG. 1;

FIG. 5 is a bottom view of the plow knife of FIG. 1; and

FIG. 6 is a partially cut away transverse cross section of the leading edge of the plow knife of FIG. 1.

DETAILED DESCRIPTION

Referring attached to FIG. 1, there is seen, partially in schematic form a system for applying fertilizer beneath the surface of the soil being treated. A frame generally designated by reference numeral 10 supports a first container or bin 11 for storing dry fertilizer in pellet or granulated form and a sealed tank 12 for storing anhydrous ammonia under pressure. The frame 10 is supported by means of wheels 13, and it is drawn by means of a traction vehicle, a rear wheel of which is shown at 15. The frame is attached to the traction vehicle, a rear wheel of which is shown at 15. The frame is attached to the traction vehicle by means of a hitch 16.

Also rigidly supported by the frame 10 is a plow knife generally designated by reference numeral 20. Although only one plow knife is shown in the illustration of FIG. 1, as disclosed in my earlier-filed copending application, a plurality of laterally spaced knives, each similar in structure and function, may be secured to and pulled by the same frame. Hence, only one such plow knife need be described in further detail in order to fully understand the inventive principle.

A flexible conduit 21 couples the anhydrous ammonia in the tank 12 to a vertical conduit 22 located at the rear of the knife 20 and pulled thereby.

A second conduit 24 couples container discharge orifice at the bottom of the dry fertilizer container 11 to the top of the plow knife 20 at which there is formed a receptacle 25 (see FIG. 2) having a generally circular upper inlet aperture and being formed into an elongated conduit as at 25a for funneling the dry fertilizer into a hollow vertical conduit formed in the shank of the plow knife 20, the conduit being designated by reference numeral 26 in FIG. 6 and extending completely vertically through the shank 27 of the knife 20 to deposit the pelletized dry fertilizer as schematically shown at 28 in FIG. 2 at the heel of the plow knife.

It will be appreciated from FIGS. 2 and 3 that the plow knife is formed generally in the shape of a boot having an upper bracket 30 for attachment to the frame 10 and provided with a generally vertical shank or leg 27, a forwardly extending toe portion 31, a heel 32, and a curved leading edge 33 extending from the lower toe portion 31 continuously and smoothly upwardly to a location adjacent the ground level. That is, for the intended depth at which the band of dry fertilizer pellets are to be deposited, the curved ankle portion 33 of the plow knife provides a smooth transition from the forward leading edge of the toe portion 31. First and second side plow molboards 36 and 37 are secured respectively to the side of the plow knife toward the rear thereof and just above the heel portion 32. As seen best in FIG. 4, the side molboard 36 is located slightly above the molboard 37, and each extends to the side of and rearwardly behind the knife at a location above the depositing orifice 38 of the ammonia conduit 22 which, as seen in FIG. 2, is slightly rearwardly bent as at 39 to divert the ammonia away from the heel portion 32 of the plow knife.

Turning now to FIG. 5, there is located at the bottom of the toe portion 31 of the plow knife, a sole which is designated by reference numeral 40. The sole 40 includes a flat leading edge portion 41 and tapered side portions 42 and 43 for forming the trench in which the fertilizer pellets are deposited. The rear portion of the sole member 40 terminates about midway of the vertical channel 26 in the plow knife to provide a lower opening 45 through which the pelletized fertilizer flows under gravity.

The plow knife is preferably formed of two sideplates of steel 46 and 47 in FIG. 5, each having a thickness of about three-sixteenths of an inch. and the transverse width of the channel 26 is five-eighths of an inch. Thus, the overall width of the plow knife is about 1 inch. The rear portions of the sideplates 46 and 47 flare outwardly toward the heel 32 as seen in FIG. 5 to shore the sides of the channel and facilitate exit of the pelletized fertilizer.

After the fertilizer is deposited in a band, as disclosed in the above-identified copending application, the liquid ammonia is directed onto the band and the molboards 36 and 37 gather soil from the side of the channel formed by the plow knife and pack the gathered soil to cover the ammonia and prevent its escape, and thus enhance its combining with the deposited dry fertilizer beneath the surface of the soil.

Turning now to FIG. 6, the leading edge of the plow is seen to include a generally flat portion 50 and first and second beveled sides 51 and 52. The width of the flat leading portion 50 is preferably in the range of twelve-sixteenths of an inch to fourteen-sixteenths of an inch; and this flat leading edge has been found to be very advantageous in forming a ribbon of soil in front of it which travels in the direction of the arrow of FIG. 2 to raise the ribbon of soil above ground level and dispose of it to either side of the moving plow knife. Thus, any debris encountered by the leading edge is moved upwardly along the continuously smoothly curved ankle portion 33 of the knife and deposited above the soil level. The debris is not dragged along with the plow knife and this advantageously provides a channel of uniform width so that the molboards 36 and 37 may gather dirt from the sides and insure that the ammonia does not escape prior to combining with the fertilizer pellets.

In this same connection, the upward and forward motion of the narrow (three-fourths of an inch) ribbon of soil prevents previous crop residues on the soil surface from making contact with the face of the leading flat surface of the knife. The upward and forward motions of the ¾-inch-wide ribbon of soil performs with equal excellence in fields where growing vegetation is present and consequent abundance of live roots in the soil profile.

The face of the knife being three-fourths of an inch wide while the knife being 1 inch wide, one-eighth of an inch back of the knife allows the soil to part at both edges of the face of the knife, and the parted soil is forced outward and backward by the forward motions of the knife as it is pulled forward in the soil. The continuous parting of the soil at both edges of the ¾-inch face forms a narrow ribbon of soil that is independent of the soil which moves outward and backward on both sides of the 1-inch-wide knife.

Being independent from the soil on either side of the 1-inch-wide knife, the ¾-inch ribbon is forced upward causing the face of the knife from the soil profile above the soil surface.

Having thus described in detail a preferred embodiment of my invention, persons skilled in the art will be able to modify the structure illustrated and substitute equivalent elements for those disclosed while continuing to practice the inventive principle; and it is, therefore, intended that all such modifications and substitutions be covered as they are embraced within the spirit and scope of the appended claims.

I CLAIM:

1. Apparatus for fertilizing soil comprising: frame means including ground-engaging support means; a pressurized source of anhydrous ammonia carried by said frame means; a source of dry, particulate fertilizer capable of reacting with said ammonia and carried by said frame means; a plow knife mounted on said frame means and being adapted to form a channel having a base at a depth of about 6–12 inches beneath ground level when said frame means is pulled by a traction vehicle, said knife including first and second sideplates spaced to define a vertical conduit extending through said knife to provide a discharge aperture at the bottom of said knife, said conduit being in fluid communication with said source of dry fertilizer whereby dry fertilizer will flow through said conduit, through said discharge aperture and be deposited in said channel, the leading edge of said knife providing a smooth upward curve from a toe portion to a location above the surface of said soil and including a leading edge generally flat in transverse direction for forming a ribbon of soil being cut to continuously transport said ribbon along said flat leading edge as said knife is moved forward to deposit the same above the surface of the soil together with any debris encountered by said edge; a conduit carried by said frame behind said plow knife extending longitudinally thereof and in fluid communication with said anhydrous ammonia, said conduit having a release orifice immediately behind said discharge aperture of said plow knife for directing the pressurized ammonia directly onto said band of deposited fertilizer; and moldboard means attached to said plow knife and extending to the side thereof and being adapted to gather soil from the side of the furrow formed by the plow knife and to pass the gathered soil behind said plow knife and onto the ammoniated fertilizer.

2. The apparatus of claim 1 wherein said leading edge of said plow knife comprises a flat edge curved generally upwardly in a smooth fashion and having a transversely flat width in the range of about three-fourths to seven-eighths of an inch for forming said ribbon of soil to carry debris above the surface of the soil.

* * * * *